US009488467B2

(12) United States Patent
PallikkaraGopalan et al.

(10) Patent No.: US 9,488,467 B2
(45) Date of Patent: Nov. 8, 2016

(54) SYSTEM AND METHOD FOR MONITORING IN REAL TIME, A GAP BETWEEN PORTIONS IN A MACHINE

(75) Inventors: Krishnakumar PallikkaraGopalan, Karnataka (IN); Joseph Vincent Pawlowski, Phoenix, AZ (US); Nirm Velumylum Nirmalan, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 1368 days.

(21) Appl. No.: 12/913,886

(22) Filed: Oct. 28, 2010

(65) Prior Publication Data

US 2012/0105619 A1    May 3, 2012

(51) Int. Cl.
  *H04N 7/18* (2006.01)
  *G01B 11/14* (2006.01)
(52) U.S. Cl.
  CPC .................. *G01B 11/14* (2013.01)
(58) Field of Classification Search
  CPC ..... H04N 7/183; H04N 7/18; G02B 23/2476
  USPC .......................................................... 348/82
  See application file for complete search history.

(56) References Cited

U.S. PATENT DOCUMENTS

| | | | |
|---|---|---|---|
| 5,349,850 A | | 9/1994 | Young |
| 5,572,039 A | | 11/1996 | Sweeney et al. |
| 6,796,709 B2 | | 9/2004 | Choi |
| 2002/0026274 A1 | | 2/2002 | Morizane et al. |
| 2006/0012612 A1* | | 1/2006 | Johnston et al. ............. 345/642 |
| 2006/0078193 A1 | | 4/2006 | Brummel et al. |
| 2006/0088414 A1 | | 4/2006 | Harivel et al. |
| 2007/0085904 A1 | | 4/2007 | Heyworth |
| 2008/0245980 A1 | | 10/2008 | Diatzikis |
| 2009/0161720 A1* | | 6/2009 | Pelletier ............................ 374/4 |
| 2009/0201364 A1 | | 8/2009 | Konomura |
| 2010/0244708 A1* | | 9/2010 | Cheung et al. ............... 315/158 |
| 2011/0135466 A1* | | 6/2011 | Latorre ..................... F03D 7/02 416/1 |
| 2011/0213391 A1* | | 9/2011 | Rivers et al. .................. 606/159 |

(Continued)

FOREIGN PATENT DOCUMENTS

| | | |
|---|---|---|
| CA | 2060914 A1 | 8/1992 |
| FR | 2243418 A1 | 4/1975 |

(Continued)

OTHER PUBLICATIONS

French Search Report and Written Opinion issued in connection with corresponding FR Application No. 1159571 on Nov. 19, 2013.

(Continued)

*Primary Examiner* — Dave Czekaj
*Assistant Examiner* — Nam Pham
(74) *Attorney, Agent, or Firm* — Ernest G. Cusick; Frank A. Landgraff

(57) ABSTRACT

A monitoring system for monitoring, in real time, a gap between a rotating portion and a stationary portion of a machine. The monitoring system includes an imaging device for forming a reference image of the gap and one or more next images of the gap, the imaging device including a portion disposed within the machine and a portion external to the machine. The system also includes an image processor coupled to the imaging device configured to monitor whether the gap is increasing or decreasing by comparing the reference image to the one or more next images.

14 Claims, 4 Drawing Sheets

(56) References Cited

U.S. PATENT DOCUMENTS

| | | | |
|---|---|---|---|
| 2012/0057010 A1* | 3/2012 | Yamauchi | 348/76 |
| 2012/0087752 A1* | 4/2012 | Herbold et al. | 408/1 R |

FOREIGN PATENT DOCUMENTS

| | | | |
|---|---|---|---|
| JP | 62186005 A | 8/1987 | |
| JP | 03205999 A | 9/1991 | |
| JP | 055425 A | 1/1993 | |
| JP | 07508584 A | 9/1995 | |
| JP | 2005214661 A | 8/2005 | |
| JP | 2006125393 A | 5/2006 | |

OTHER PUBLICATIONS

Japanese Office Action issued in connection with corresponding JP Application No. 2011232378 on Oct. 6, 2015.

Chinese Office Action issued in connection with corresponding CN Application No. 201110344814.3 on Oct. 19, 2015.

Unofficial English Translation of Japanese Office Action issued in connection with corresponding JP Application No. 2011232378 on Apr. 26, 2016.

* cited by examiner

SYSTEM AND METHOD FOR MONITORING IN REAL TIME, A GAP BETWEEN PORTIONS IN A MACHINE

BACKGROUND OF THE INVENTION

The subject matter disclosed herein relates to monitoring and, in particular, to monitoring the distances or axial gaps between rotating and stationary parts in a turbine. Turbines are used for electrical power generation or to drive compressors and other rotary equipment. Turbines are expensive and need to be available and reliable for continuous operation. Such turbines typically include a rotor that rotates within an outer casing. The rotor includes buckets having a base and a blade. Nozzles in the casing are interspersed between the blades and provide direction to the heated vapor (steam or gas) to the blades. The vapor causes the blades to turn and, consequently, causes the rotor to turn.

Some turbines include one or more bucket stages. The bucket stages are positioned and retained axially by snapring type lockwires. These lockwires are typically held in the proper radial position by dowel pins staked in the turbine wheel dovetail hooks. Improper staking of a dowel pin or snapping of the lock wire can cause damage to the turbine and, consequently, a forced outage. For example, a bucket or a portion of the bucket could start moving because it is no longer constrained axially resulting in damage to downstream parts.

The most reliable bucket inspection methods utilize a borescope that enters the turbine through the casing. Such an inspection, however, requires taking the turbine out of service.

BRIEF DESCRIPTION OF THE INVENTION

According to one aspect of the invention, a monitoring system for monitoring, in real time, a gap between a rotating portion and a stationary portion of a machine is disclosed. The monitoring system of this aspect includes an imaging device for forming a reference image of the gap and one or more next images of the gap, the imaging device including a portion disposed within the machine and a portion external to the machine. The system of this aspect also includes an image processor coupled to the imaging device configured to monitor whether the gap is increasing or decreasing by comparing the reference image to the one or more next images.

According to another aspect of the invention, a method of monitoring a gap between a rotating portion and a stationary portion of a machine is disclosed. The method of this aspect includes receiving at an image processor an image of the gap while the machine is operating; comparing the image to a reference image; and generating an alarm in the event the image is different than the reference image.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
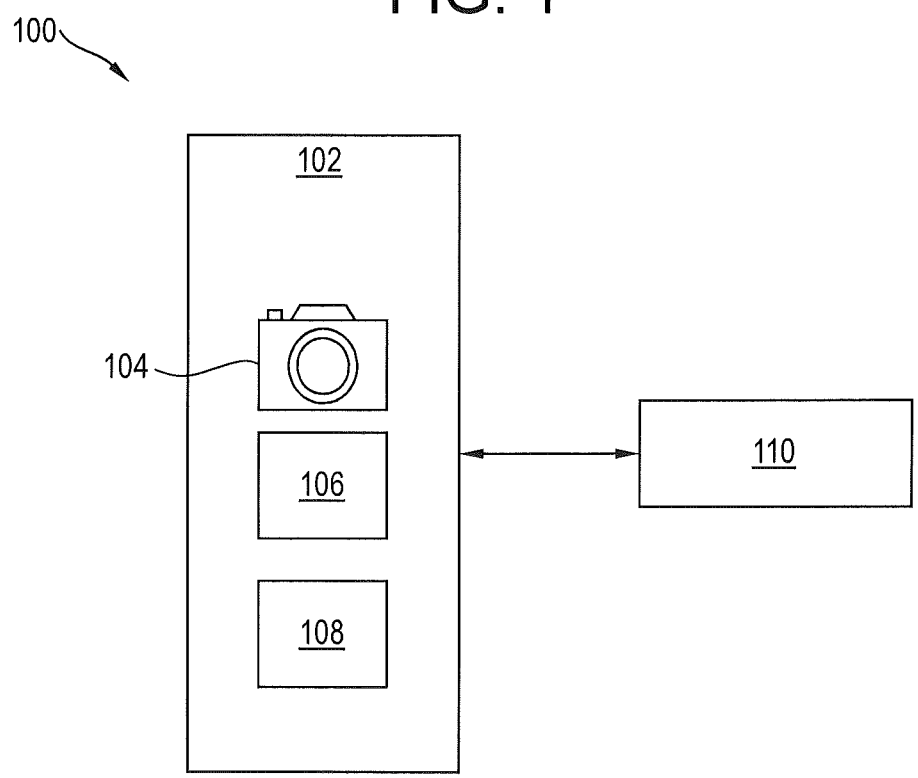
FIG. 1 is a block diagram of a monitoring system according to one embodiment.

FIG. 1 shows an example of a monitoring system 100 according to one embodiment. The monitoring system 100 is utilized to monitor turbine buckets for axial movement in one embodiment.

The monitoring system 100 of this embodiment includes an imaging device 102. The imaging device 102 includes an imaging recording device 104 and an image transmission medium 106. As illustrated in FIG. 1, the imaging recording device 104 is a camera but is not so limited. The image transmission medium 106 is an endoscope or other suitable fiber imaging system in one embodiment. The image transmission medium 106 conveys an image to the camera 104 from a location inaccessible by the camera 104. For example, the image transmission medium 106 conveys an image from inside an operating turbine to the camera 104. The imaging device 102 optionally includes an illumination system 108. The illumination system 108 provides illumination to an end of the image transmission medium 106 to illuminate an area of interest. In one embodiment, the illumination system 108 includes one or more fiber optic cables for transmitting light to the area of interest.

In one embodiment, the camera 104 has an integration time of 1 microsecond or less. Such an integration time allows for the monitoring system to be utilized in environments, such as a turbine, where elements are moving at very high speeds. For instance, a turbine may rotate at a speed of 3000-3600 rpm.

The monitoring system 100 also includes an image processor 110. The image processor 110 is a computing device in one embodiment. The image processor 110 receives images from the camera 104. In one embodiment, the image processor 110 compares current images to a reference image to determine if conditions in an area of interest have changed. The image processor 110 may employ various image processing and comparison techniques. For example, the image processor 110 may utilize pixel comparison techniques or pattern recognition using neural networks to compare the current images to the reference image.

As discussed above, it may be beneficial to monitor the condition of buckets or other elements of a turbine while the turbine is operational. Accordingly, in one embodiment, the monitoring system 100 is utilized in a turbine while it is operating. In such an embodiment, the image transmission medium 106 and the illumination system 108 are displaced within a turbine and the transmission medium 106 conveys images from inside the turbine to the camera 104 while the turbine is running. In such an embodiment, the image transmission medium 106 and the illumination system 108 may be suitably shielded from heat.

Figure 2:
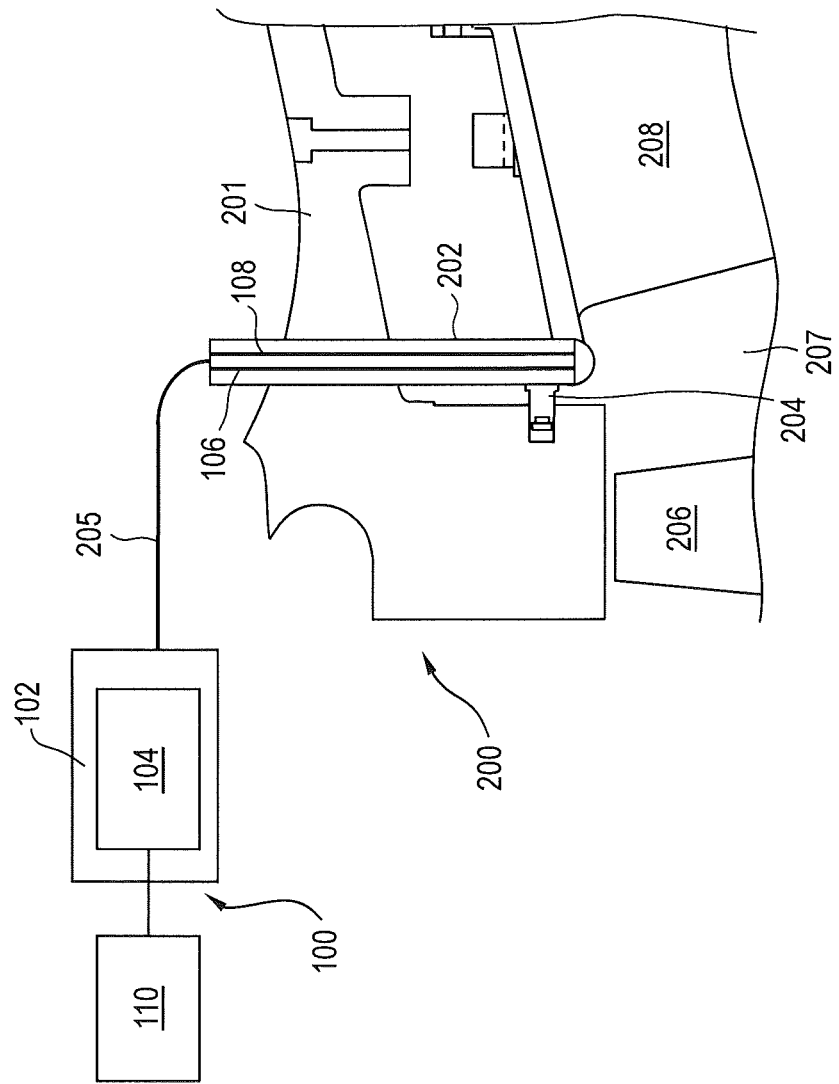
FIG. 2 is a block diagram of a monitoring system according to one embodiment in an example operating environment.

FIG. 2 illustrates an operating environment 200 for the monitoring system 100 shown in FIG. 1. The operating environment 200 is generally shown as a portion of turbine. The turbine includes an outer casing 201. The outer casing 201 typically includes borescope access holes provided therein. Such borescope access holes are utilized to inspect the turbine when it is off-line. According to one embodiment, portions of the monitoring system 100 are displaced within the outer casing 201 through one of these borescope access holes.

The monitoring system 100 of this embodiment includes the imaging device 102, the camera 104, the transmission medium 106, the illumination system 108 and the image processor 110 as described in FIG. 1. In one embodiment the transmission medium 106 and at least a portion of the illumination system 108 are coupled to the imaging device 102.

In the illustrated embodiment, portions of the transmission medium 106 and the illumination system 108 are disposed within the outer casing 201. In one embodiment, a protective cover 202 protects the portions of the transmission medium 106 and the illumination system 108 disposed within the outer casing 201. The protective cover 202 is clear and formed of material capable of withstanding the heat within a turbine in one embodiment. A bracket 204 or other retaining means holds the protective cover 202 and, thus, the portions of the transmission medium 106 and the illumination system 108 disposed within the outer casing 201, in a fixed relationship relative to the outer casing 201. As the outer casing 201 does not typically move, the fixed relationship between the protective cover 202 and the outer casing 201 ensures that the field of view of the transmission medium 106 (and thus, of camera 104) is held constant or nearly constant.

In the illustrative embodiment, the field of view is located between a blade 206 and a nozzle 208 of a turbine. In particular, the field of view is directed to an empty area 207 between the blade 206 and the nozzle 208. In one embodiment, the blade 206 is a first stage blade and the nozzle 208 is a second stage nozzle. Of course, the blades 206 and nozzle 208 could be located in any stage of a turbine.

In operation, the camera 104 is utilized to monitor a field of view in the empty area 207. The empty area 207 may also be referred to as an axial gap. The illumination system 108 provides illumination to the empty area 207 and the transmission medium 106 carries an image back to the camera 104. In one embodiment, the transmission medium 106 is mounted by bracket 204 perpendicular to an axis of rotation of a turbine to capture an image of an axial gap between the blade 206 and nozzle 208 as input.

In one embodiment, the empty area 207 is located in a high temperature location. As such, the camera 104 is located outside of the transmission medium 106 transmits images from the high temperature location to the camera 104 which is located in a cooler location outside the casing 201.

In operation, an image of the empty area 207 (e.g., an axial gap between the blade 206 and the nozzle 208) is taken and forms a reference image. Of course, image-processing techniques may be applied to the image. For example, known image processing techniques for removing the background information or noise and to prepare the image for further processing could be used. In addition, the image may need to be enhanced by increasing sharpness, removing blurs, etc.

In one embodiment, a second image is formed at a later time. The second image is compared to the reference image. Image comparison techniques including, but not limited to, pixel comparison techniques, pattern recognition using neural networks or image comparison by metric embeddings may be utilized to compare the images and note any changes between the two.

Figure 3:
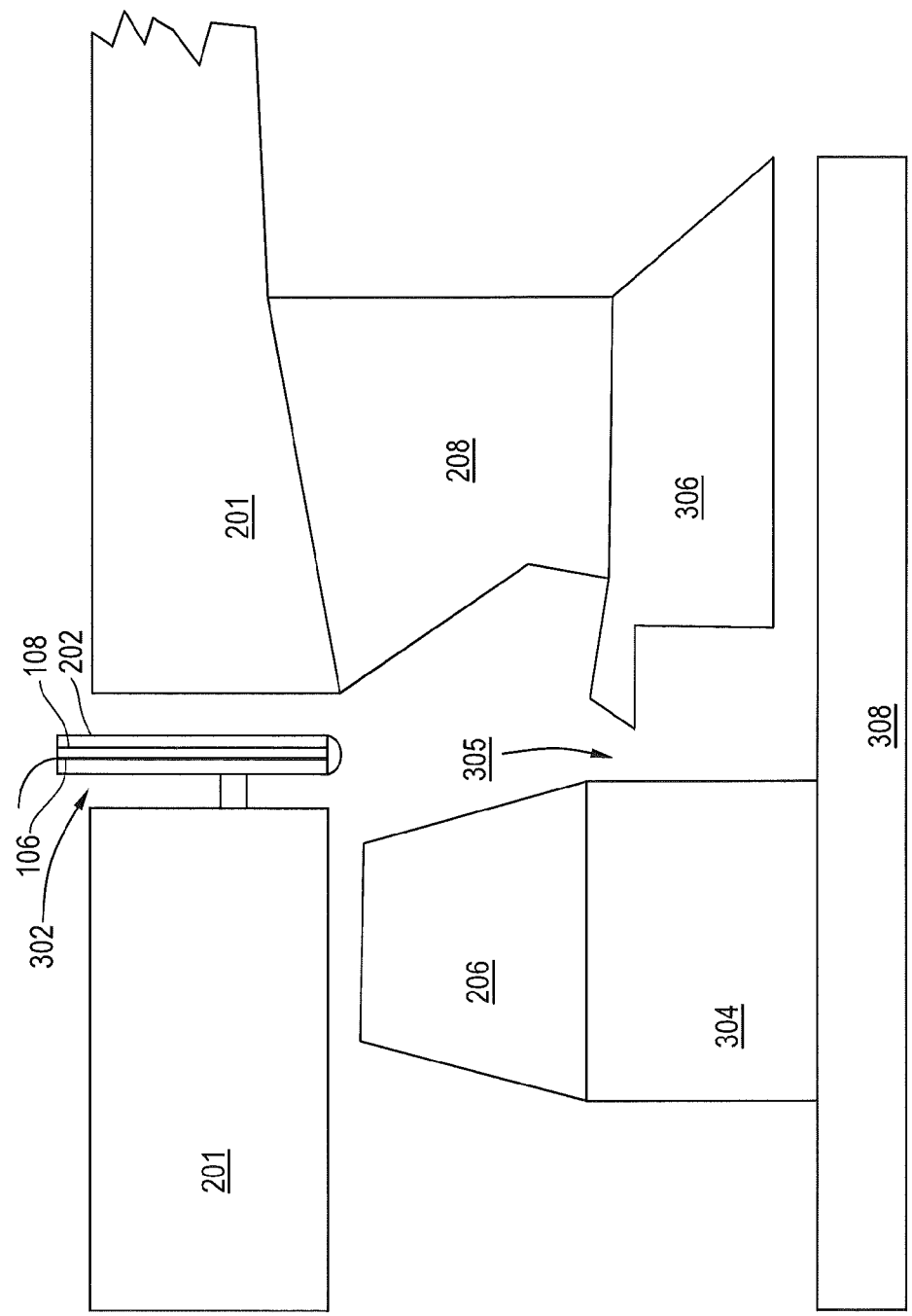
FIG. 3 is a difference view of the example operating environment of FIG. 2.

FIG. 3 shows a particular implementation of the monitoring system 100 of the present invention. In this illustration, the protective cover 202 that encases portions of the transmission medium 106 and illumination system 108 is disposed through a borescope access hole 302 in an outer casing 201 of a turbine. The outer casing 201 is coupled to a nozzle 208. The nozzle 208 includes a lower portion 306 that is a diaphragm in one embodiment. The lower portion 306 surrounds a rotor shaft 308. The rotor shaft 308 is coupled to one or more bucket bases 304. The bucket bases 304 each support a blade 206. The bucket base 304 (bucket) is separated from the lower portion 306 by an axial gap 305.

The rotor shaft 308 rotates at a high rate of speed. In some cases, it may rotate at a speed of about 3000-3600 rpm. Accordingly, the camera 104 (FIG. 1) has a frame rate with an integration time of 1 micro second or less in one embodiment. This allows for images to be taken as each bucket 304 rotates past the axial gap 305.

Figure 4:
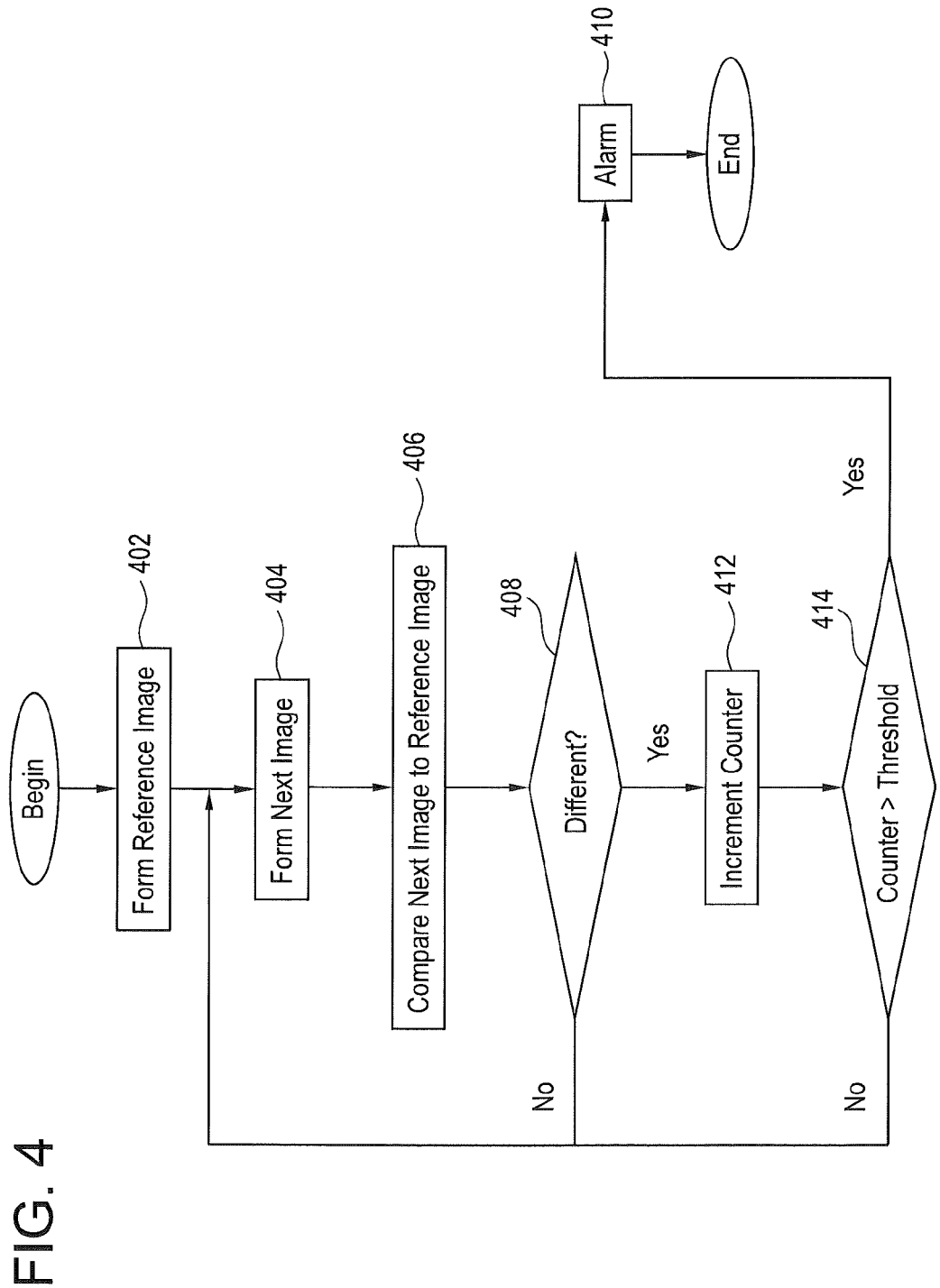
FIG. 4 is a flow chart showing a method according to one embodiment.

FIG. 4 is a block diagram of a method according to one embodiment. At a block 402 a reference image is formed of an internal portion of a machine. The machine is a turbine in one embodiment. While the portion of the machine is an axial gap between turbine stages in one embodiment, the portion is not so limited and can include any internal portion of the machine. The reference image is formed by an imaging system that is implemented, in one embodiment, as the imaging system described above. Of course, other imaging systems may be utilized.

At a block 404 a next image is formed from the same location in the machine. In one embodiment, an image is taken each time a bucket passes a specific location within the machine. Of course, the next image can be formed at any time as long as it is after the reference image is formed.

At a block 406 the next image is compared to the reference image. Image comparison techniques including, but not limited to, pixel comparison techniques, pattern recognition using neural networks or image comparison by metric embeddings may be utilized to compare the images and note any changes between the two images.

At a block 408 it is determined if there are any differences between the reference image and the next image. In one embodiment, the difference may be in the size of an axial gap between two portions of a turbine. If there is no difference, processing returns to block 404. If there is a difference, processing may pass directly to block 410 where an alarm is created. In one embodiment, however, the method also includes optional blocks 412 and 414. Block 412 is entered in the event that there is a difference between the next image and the reference image and a counter is incremented. At optional block 414 it is determined if the counter has exceeded a threshold. If so, the alarm is created at block 410. Otherwise, processing returns to block 404. In short, optional blocks 412 and 414 provide for an extended sample of images having differences from the reference image to reduce possible single image aberrations leading to false alarms. It shall be understood that a new reference image may be formed at any time. As such, in some cases, after either block 408 or 414, processing may return to block 402 rather than block 404 as illustrated in FIG. 4.

It shall be understood that while the terms "first," "second" and the like have been used to distinctly identify certain herein, in the appended claims, the ordering and naming of certain devices may vary depending on the context.

In support of the teachings herein, various analysis components may be used, including digital and/or an analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), solid-state drive (SSD), or any other type that when executed causes a computer to implement methods of the present invention. These instructions may provide for equipment operation, control, data collection and analysis and other functions deemed relevant by a system designer, owner, user or other such personnel, in addition to the functions described in this disclosure. Accordingly, an embodiment if the present invention may include a monitoring system implemented in a computing device that determines if an axial gap in a turbine is varying in size based on comparisons to a reference image.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A monitoring system for monitoring, in real time, a gap between a rotating portion and a stationary portion of a turbine that includes an outer casing surrounding the rotating portion and the stationary portion, the monitoring system comprising:
   an imaging device for forming a reference image of the gap and one or more next images of the gap, the imaging device including a portion that passes through the outer casing, a portion disposed within the outer casing and a portion external to the outer casing; and
   an image processor coupled to the imaging device configured to monitor whether the gap is increasing or decreasing by comparing the reference image to the one or more next images.

2. The monitoring system of claim 1, wherein the gap is an axial gap between a bucket and a nozzle.

3. The monitoring system of claim 2, wherein the bucket is a first stage bucket and the nozzle is a second stage nozzle.

4. The monitoring system of claim 1, wherein the portion disposed within the outer casing is formed by one or more endoscopes.

5. The monitoring system of claim 1, wherein the portion disposed within the outer casing is formed by a fiber optic cable.

6. The monitoring system of claim 1, further comprising:
   a protective cover surrounding some or all of the portion disposed within the outer casing.

7. The monitoring system of claim 1, wherein the portion external to the outer casing is a camera.

8. The monitoring system of claim 7, wherein the camera receives images of the gap from the portion disposed within the outer housing.

9. The monitoring system of claim 8, wherein the camera samples the images each time a bucket passes a nozzle in the turbine.

10. The monitoring system of claim 1, further comprising:
    an illumination system disposed within the outer housing that provides illumination to the internal location.

11. A method of monitoring a gap, in real time, between a rotating portion and a stationary portion of a turbine that includes an outer casing surrounding the rotating portion and the stationary portion, the method comprising:
    receiving at an image processor an image of the gap while the turbine is operating, wherein the image is received from an imaging device that includes a portion disposed within the outer housing and a portion external to the outer housing;
    comparing the image to a reference image; and
    generating an alarm in the event the image is different than the reference image.

12. The method of claim 11, wherein the gap is an axial gap between a bucket and nozzle in a turbine.

13. The method of claim 12, wherein comparing includes at least one of:
    pixel comparison techniques, pattern recognition using neural networks and image comparison by metric embeddings.

14. The method of claim 11, wherein generating includes determining that a threshold of previous images that were different than the reference image was exceeded.

* * * * *